US008802764B2

(12) United States Patent
Mao et al.

(10) Patent No.: US 8,802,764 B2
(45) Date of Patent: Aug. 12, 2014

(54) NUCLEATING AGENT FOR NYLON SYSTEM

(71) Applicants: Megan Mao, Shanghai (CN); Jun Li, Shanghai (CN); Vincent M. Clarke, Morris Plains, NJ (US)

(72) Inventors: Megan Mao, Shanghai (CN); Jun Li, Shanghai (CN); Vincent M. Clarke, Morris Plains, NJ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 13/683,957

(22) Filed: Nov. 21, 2012

(65) Prior Publication Data

US 2013/0150515 A1 Jun. 13, 2013

Related U.S. Application Data

(60) Provisional application No. 61/587,824, filed on Jan. 18, 2012, provisional application No. 61/569,066, filed on Dec. 9, 2011.

(51) Int. Cl.

| | |
|---|---|
| ***C08L 33/02*** | (2006.01) |
| ***C08L 23/08*** | (2006.01) |
| *C08K 5/00* | (2006.01) |

(52) U.S. Cl.

CPC ............... *C08L 33/02* (2013.01); *C08K 5/0083* (2013.01); *C08L 23/0869* (2013.01); *C08L 2205/24* (2013.01); *Y10S 525/919* (2013.01)

USPC ........... 524/451; 525/179; 525/183; 525/221; 525/919

(58) Field of Classification Search

USPC ................... 524/451; 525/179, 183, 919, 221

See application file for complete search history.

(56) References Cited

U.S. PATENT DOCUMENTS

| | | | | |
|---|---|---|---|---|
| 4,536,533 | A * | 8/1985 | Chen et al. | 524/161 |
| 4,603,172 | A * | 7/1986 | Albee et al. | 525/143 |
| 4,749,736 | A * | 6/1988 | Khanna et al. | 524/230 |
| 4,977,213 | A * | 12/1990 | Giroud-Abel et al. | 525/66 |
| 5,298,571 | A * | 3/1994 | Statz et al. | 525/330.2 |
| 5,496,918 | A | 3/1996 | Khanna et al. | |
| 5,552,463 | A * | 9/1996 | Akkapeddi et al. | 524/98 |
| 6,103,805 | A | 8/2000 | Kojima et al. | |

(Continued)

FOREIGN PATENT DOCUMENTS

| | | | |
|---|---|---|---|
| KR | 1019980066246 | A | 10/1998 |
| WO | 2008051450 | A2 | 5/2008 |
| WO | 2011094542 | A2 | 8/2011 |

OTHER PUBLICATIONS

L. Holliday, "Ionic Copolymers," pp. 74-75, John Wiley & Sons, New York (1975).

(Continued)

*Primary Examiner* — Brieann R Fink
(74) *Attorney, Agent, or Firm* — Kenyon & Kenyon LLP

(57) ABSTRACT

The present invention provides a nucleating agents comprising: a) ethylene-acrylic acid ionomers selected from the group consisting of ethylene-acrylic acid calcium ionomers and ethylene-acrylic acid zinc ionomers and combinations thereof; wherein the ionomers have a molecular weight between about 1000 and about 10000; b) talcum; and c) ethylene-acrylic acid copolymers. The present invention also provides plastic compositions comprising: a) nylon and b) a nucleating agent, as well as a processes of making such plastic compositions. The present invention also provides nucleating agents comprising only one or two of the above types of compounds, as well as plastic compositions comprising such nucleating agents and processes of making such a plastic compositions.

9 Claims, 15 Drawing Sheets

(56) References Cited

U.S. PATENT DOCUMENTS

Figure 1A:
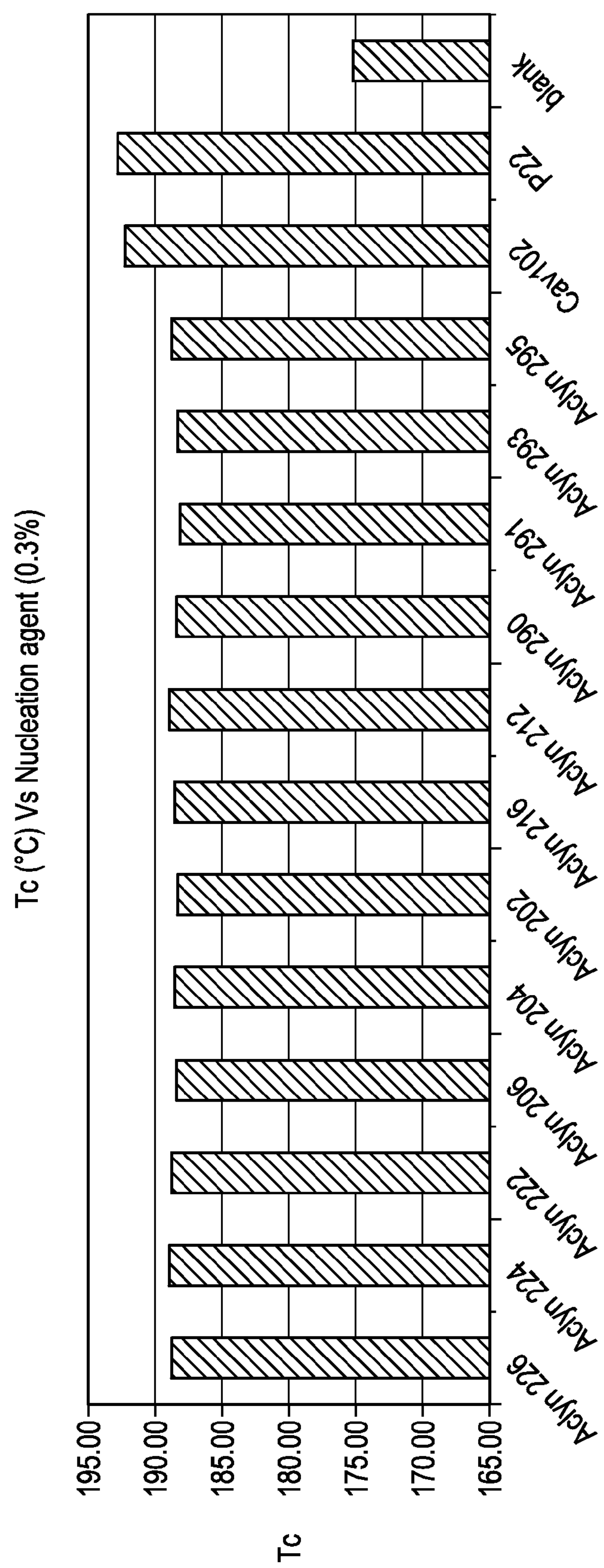

| | | | | |
|---|---|---|---|---|
| 6,187,864 | B1 | 2/2001 | Rajagopalan | |
| 6,726,968 | B2 | 4/2004 | Porter | |
| 6,756,443 | B2 * | 6/2004 | Feinberg | 525/66 |
| 7,776,947 | B2 | 8/2010 | Jordan | |
| 2002/0013423 | A1 | 1/2002 | Lysek et al. | |

OTHER PUBLICATIONS

E. Martuscelli et al., "Crystallization, Morphology, Structure and Thermal Behaviour of Nylon-6/Rubber Blends," Polymer (1985), vol. 26, No. 2, pp. 270-282.

N.S. Murthy et al., "Structure and Properties of Talc-Filled Polyethylene and Nylon 6 Films," Journal of Applied Polymer Science (1986), vol. 31, No. 8, pp. 2569-2582.

Susan E. M. Selke, Plastic Packaging, Carl Hanser Verlag, 2nd Edition, 2004, pp. 95-97.

H. Wang et al., "The Block Copolymers and Polymer Blends of Nylon 6 with Poly(4,4'-Diphenylsulfone terephthalamide). I. Preparation and Thermal Properties," Journal of Applied Polymer Science (1989), vol. 27, No. 4, pp. 1359-1371.

The International Search Report mailed Mar. 15, 2013 in International Application No. PCT/US2012/067905.

* cited by examiner

NUCLEATING AGENT FOR NYLON SYSTEM

CROSS REFERENCES TO RELATED APPLICATIONS

The present application claims priority under 35 U.S.C. §119(e) to U.S. Provisional Patent Application Nos. 61/587,824, filed on Jan. 18, 2012, and 61/569,066, filed on Dec. 9, 2011. Both provisional applications are incorporated herein by reference.

FIELD OF THE INVENTION

The invention relates to nucleating agents for nylon plastics and methods of making and using the same.

BACKGROUND OF THE INVENTION

X-ray diffraction studies of synthetic linear polyamides such as nylon 6 have shown that they may exist in one or more of several different crystalline forms. Structures which have been recognized include, in the case of nylon 6, the amorphous form, the pseudo hexagonal gamma-form, and the monoclinic alpha form.

The amorphous form of nylon 6 is obtained by rapid quenching of molten polymer to a temperature below the glass transition temperature of the nylon. Both the amorphous and gamma-forms are relatively unstable upon application of heat and moisture. Heating amorphous material to a temperature between approximately 55° C. and 150° C. results in at least a partial conversion of the amorphous form into the gamma-form. At temperatures above 150° C., a transition of the gamma- into the alpha-form occurs. This monoclinic alpha structure represents a highly ordered crystalline form that is stable at temperatures up to the melting point of the nylon 6. It is the most desirable crystalline form from the standpoint of obtaining the optimum physical properties with nylon 6, including mold shrinkage and maximum dimensional stability.

The "super" or morphological structure in which the crystalline units are arranged also affects the physical properties of nylons. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture or graininess in the bulk of the material and influences optical as well as physical properties. Physical properties improve with increasing homogeneity and fineness of the spherulitic structure throughout the bulk of the material. To obtain optimum physical properties in articles fabricated from nylon 6, it is desirable, therefore, to produce a highly crystalline material, crystallized predominantly in the stable alpha-form, with an extremely fine, dense and uniform morphological structure. Among the physical properties affected by increased crystallinity and improved morphological structure are abrasion resistance, heat distortion temperature, inherent stability or resistance to deformation, resistance to hot water, coefficient of expansion, hardness, tensile yield strength and surface hardness.

Customary fabricating procedures used with nylon 6 such as injection molding, which include a rapid cooling from the melt, generally result in articles which contain the different crystalline structural forms to a varying degree depending upon the thermal history of the article.

It is known that a greater degree of crystallinity is obtained when polyamides are cooled extremely slowly from the melt. However, large spherulites develop under these conditions and the process is not economical. Crystallinity and the uniformity of the morphological structure can also be increased by annealing treatments after solidification. However, such practices are not economically feasible in ordinary industrial fabricating procedures as, for example, injection molding.

Investigators have found that bodies shaped from polyamides having a homogeneous and fine spherulitic structure can be obtained by addition to the polyamide melt of finely divided solids which act as crystallization nuclei. See references cited in, e.g., U.S. Pat. No. 5,496,918. The primary function of such nucleating agents when cooling semi-crystalline polymers from the molten into the solid form is to increase the number of nuclei formed in a given time interval at a predetermined temperature. The final and overall crystallinity, however, depends not only on the number of nuclei that are formed but also on the spherulitic growth rate from such nuclei. In order to be of practical use, therefore, nucleating agents not only must produce a large number of nuclei, but must also facilitate a rapid spherulitic growth rate under conditions of rapid cooling to a temperature above the glass transition temperature of the polyamide, i.e., they must reduce the time that is necessary under a given set of conditions for crystallization to start. This time is usually referred to as "induction time." Subsequent growth from the spherulitic center depends on the polymer chain mobility. Thus, another factor in the spherulitic growth rate is the macroscopic viscosity of the polymer and its temperature dependence. All segmental motion is "frozen in" at the glass transition temperature (Tg) and no additional crystallization occurs even when nuclei are present. This Tg is about 50° C. in nylon 6.

There remains a need for improved nucleating agents. The present invention addresses this need.

SUMMARY OF THE INVENTION

The present invention provides a nucleating agent including ethylene-acrylic acid ionomers, talcum and ethylene-acrylic acid copolymers. The ionomers have a molecular weight between about 1000 and about 10000 and are selected from the group consisting of ethylene-acrylic acid calcium ionomers and ethylene-acrylic acid zinc ionomers and combinations thereof. The present invention further provides a plastic composition including such a nucleating agent and nylon. The present invention further provides a process of making a plastic composition including a step of mixing a nylon resin with such a nucleating agent.

The present invention further provides a nucleating agent including ethylene-acrylic acid ionomers selected from the group consisting of ethylene-acrylic acid calcium ionomers and ethylene-acrylic acid zinc ionomers and combinations thereof wherein the ionomers have a molecular weight between about 1000 and about 10000.

The present invention further provides a nucleating agent comprising ethylene-acrylic acid copolymers, wherein the ethylene-acrylic acid copolymers have a molecular weight between about 1000 and about 10000 and an ethylene:acrylic acid monomer ratio of between about 19:1 and about 4:1.

In some embodiments of the present invention, the nucleating agent additionally includes talcum. In other embodiments of the present invention, the ethylene-acrylic acid ionomers consist essentially of the ethylene-acrylic acid calcium ionomers sold under the trademark ACLYN® 204. In other embodiments of the present invention, the ethylene-acrylic acid copolymers consist essentially of the ethylene-acrylic acid copolymers sold under the trademark A-C® 540A.

In some embodiments of the present invention, the ethylene-acrylic acid calcium ionomers are present at a concentration of between about 35 weight % and about 45 weight % of the total weight of the nucleating agent; the talcum is present at a concentration of between about 15 weight % and about 25 weight % of the total weight of the nucleating agent; and the ethylene-acrylic acid copolymers are present at a concentration of between about 35 weight % and about 45 weight % of the total weight of the nucleating agent.

In other embodiments of the present invention, the nylon is selected from the group consisting of nylon 6, nylon 6,6 and nylon 6/6,6 and a combination thereof. In other embodiments of the present invention, the nylon consists essentially of nylon 6.

In other embodiments of the present invention, the ethylene-acrylic acid calcium ionomers are present at a concentration of between about 0.17 weight % and about 0.25 weight % of the total nylon weight; the talcum is present at a concentration of between about 0.06 weight % and about 0.12 weight % of the total nylon weight; and the ethylene-acrylic acid copolymers are present at a concentration of between about 0.16 weight % and about 0.25 weight % of the total nylon weight.

In other embodiments of the present invention, the nucleating agent is present at a concentration of between about 0.35 weight % and about 0.65 weight % of the total nylon weight. In other embodiments of the present invention, the weight ratio between the ethylene-acrylic acid copolymers and the talcum is between about 1:1 and about 9:1, preferably 7:3; and the weight ratio between the ethylene-acrylic acid ionomers and the talcum is between about 1:1 and about 9:1, preferably 7:3.

In some embodiments of the present invention, the plastic composition has a crystallization rate of between about 800 and about 900 1000*/t1/2 per minute. In other embodiments of the present invention, the plastic composition has a nucleation temperature of between about 180° C. and about 200° C. In other embodiments of the present invention, the plastic composition has a heat distortion temperature of between about 60° C. and about 70° C. In other embodiments of the present invention, the plastic composition has a notched izod strength of between about 40 J/m and about 50 J/m.

BRIEF DESCRIPTIONS OF THE FIGURES

Figure 1B:
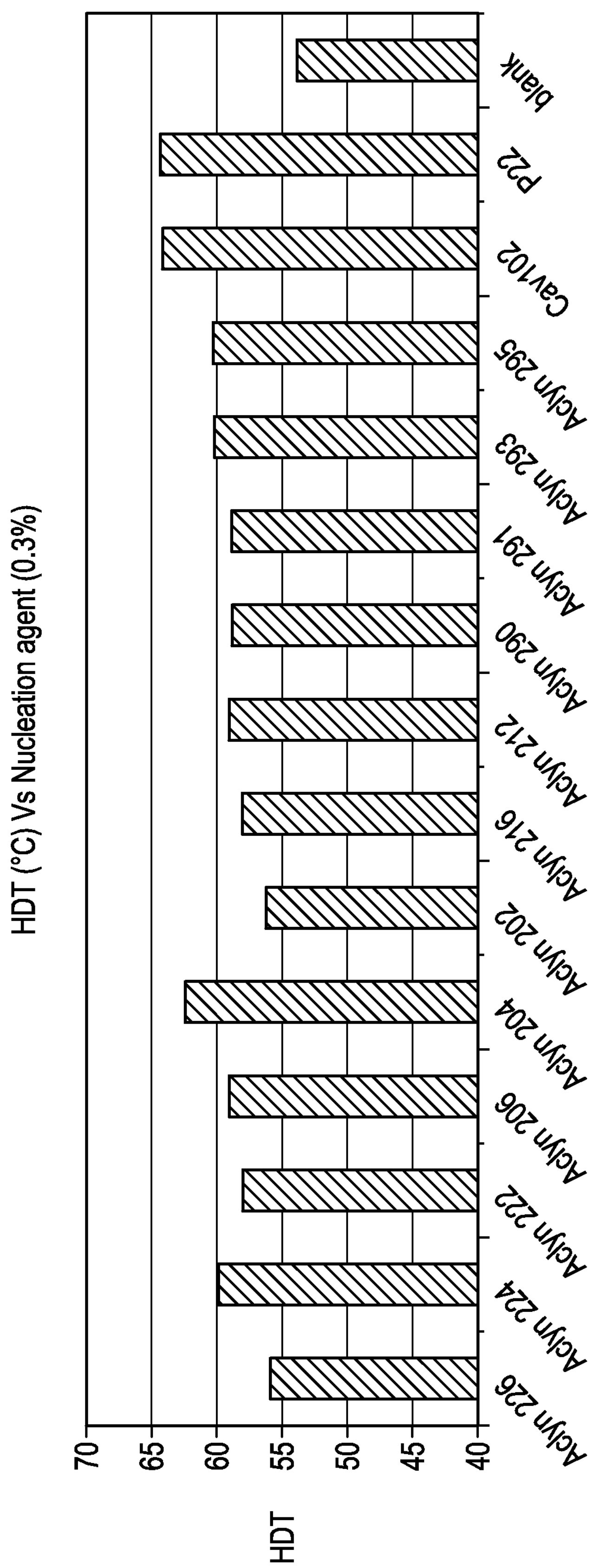
Figure 1C:
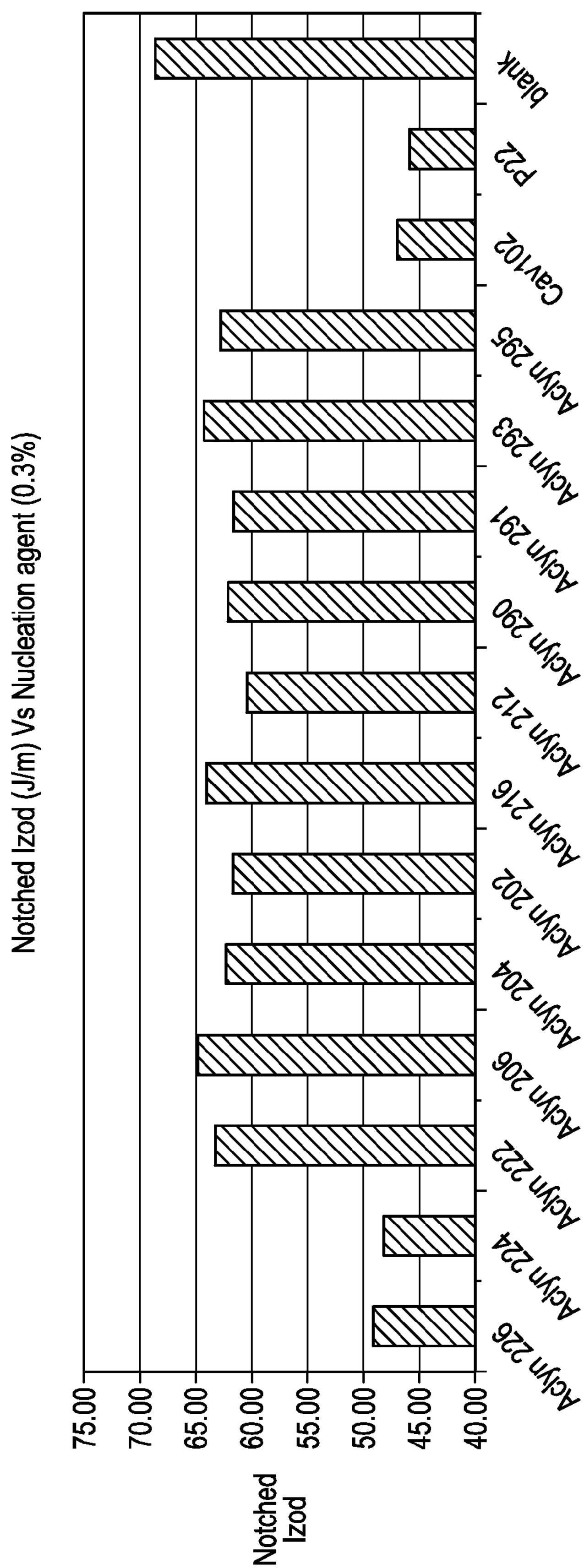

FIG. 1 shows the effects of a 0.3 weight % dosage (with respect to the nylon 6 resin weight) of different ethylene-acrylic acid zinc or calcium ionomers sold under the trademark ACLYN® on the nucleation temperature (top panel), heat distortion temperature (HDT) (center panel) and notched izod strength (bottom panel) of nylon 6 resin. Nylon 6 resin containing an equal amount of a different commercially available nucleating agent (Cav102, which is calcium soap of montanic acid that is commercially available from Clariant Corporation, Charlotte, N.C.; or P22, which is a mixture of an organic and inorganic nucleating agent the main ingredient of which is polyamide 2, commercially available from BrüggemannChemical U.S., Inc., Philadelphia, Pa.) served as a positive control and Nylon 6 resin containing no nucleating agent (blank) served as a negative control.

Figure 2A:
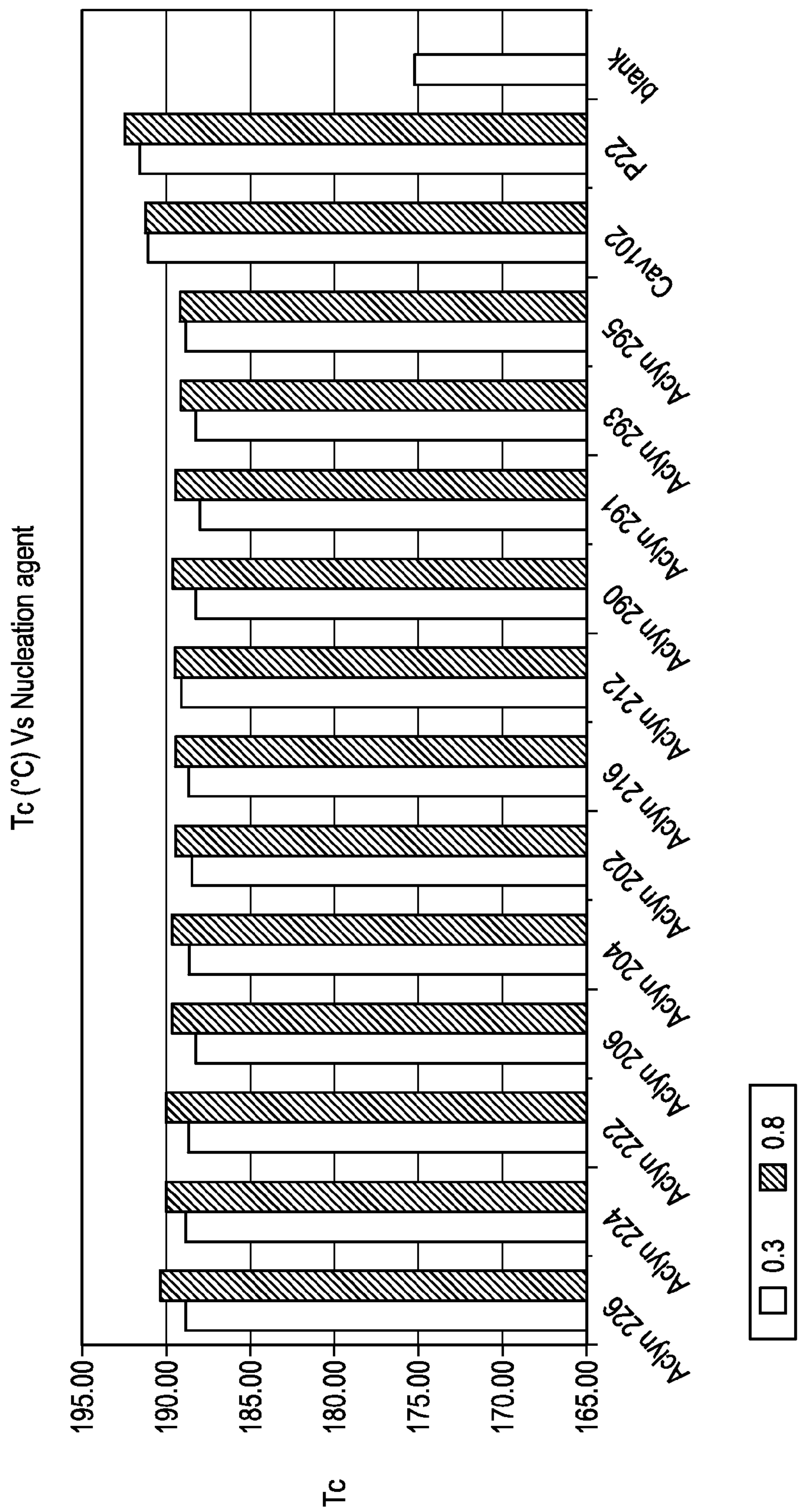
Figure 2B:
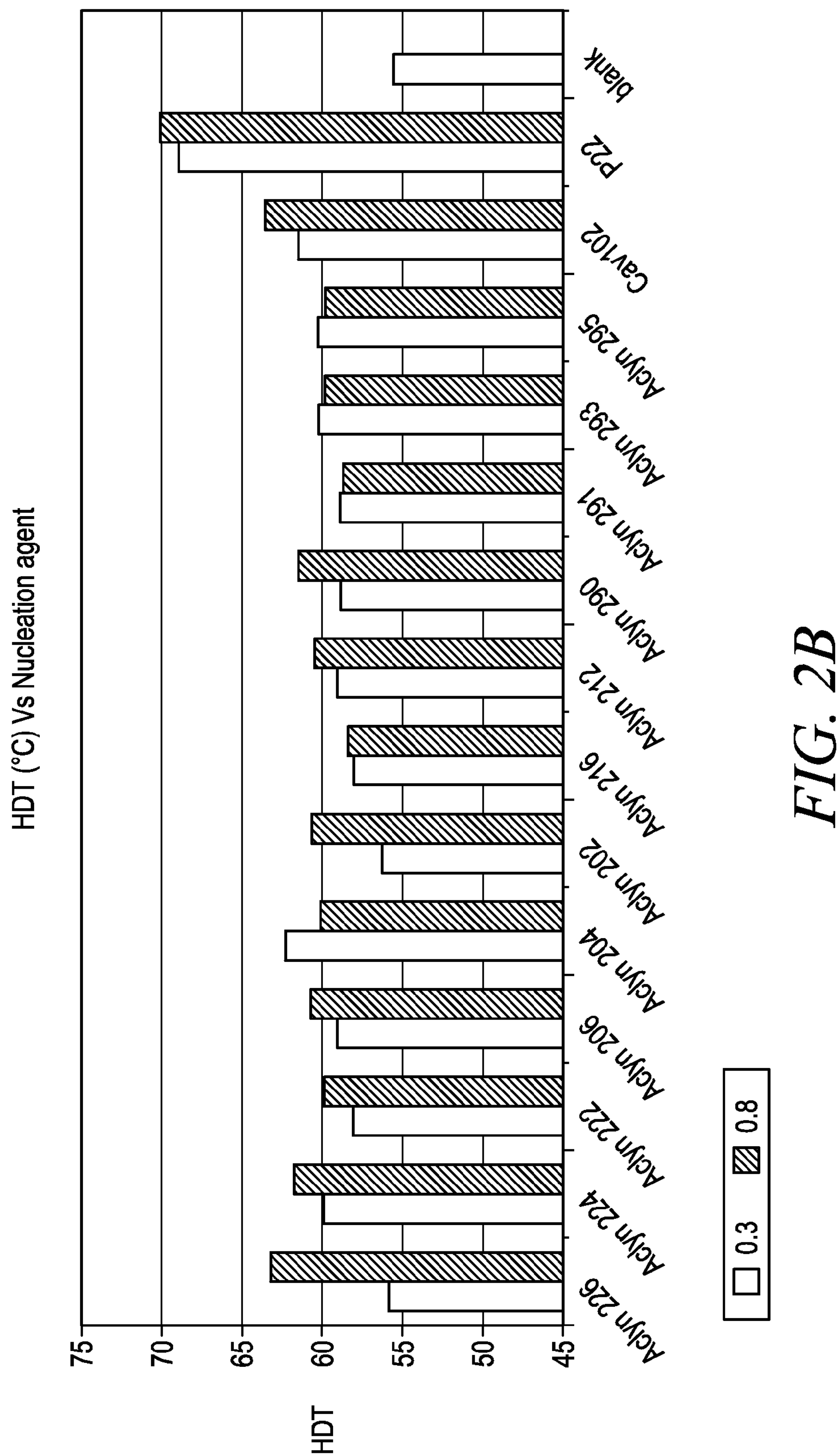
Figure 2C:
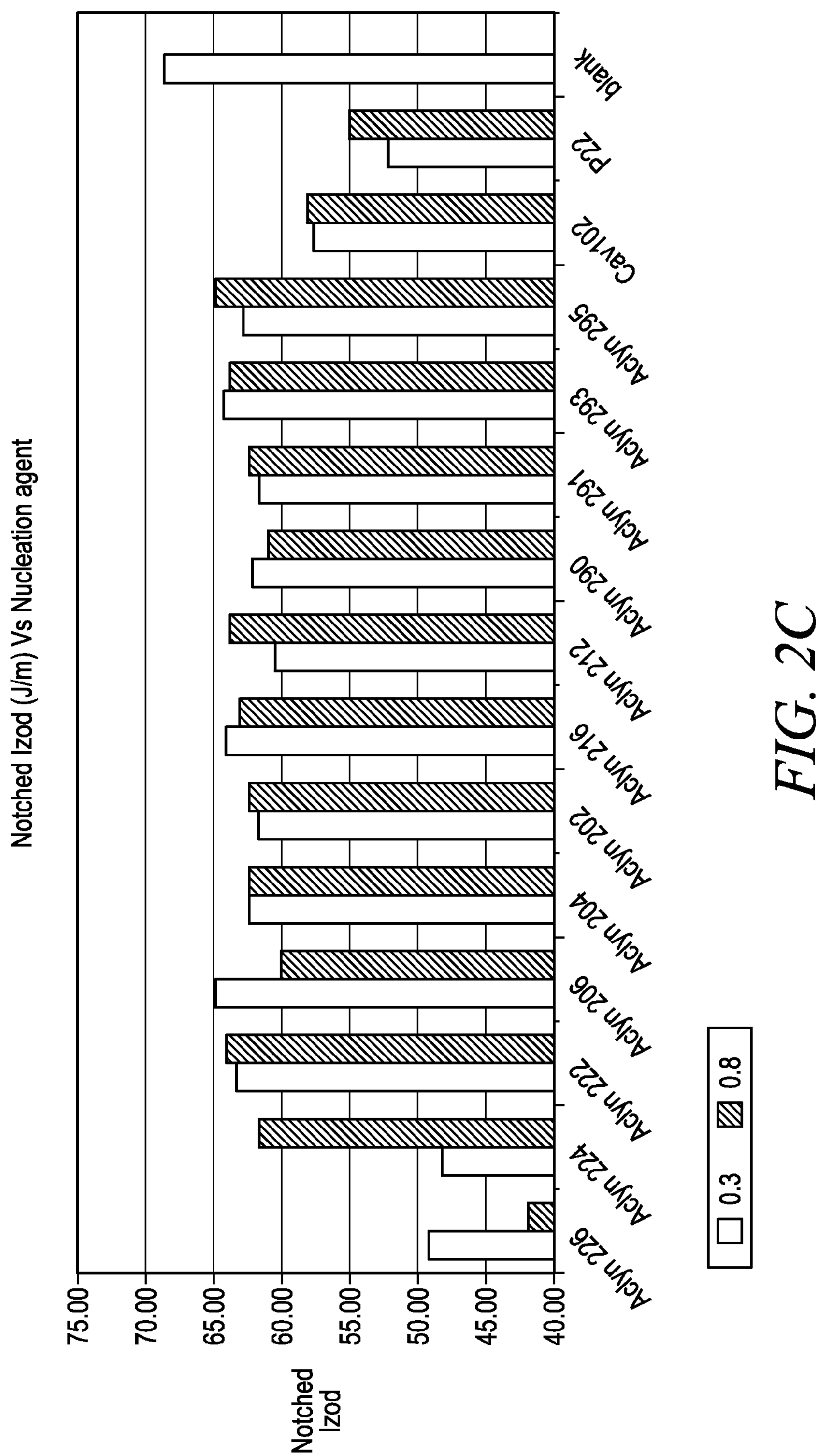

FIG. 2 shows the effects of a 0.3 weight % vs. a 0.8 weight % dosage (with respect to the nylon 6 resin weight) of different ethylene-acrylic acid zinc or calcium ionomers sold under the trademark ACLYN® on the nucleation temperature (top panel), heat distortion temperature (HDT) (center panel) and notched izod strength (bottom panel) of nylon 6 resin. The controls are the same as described above.

Figure 3A:
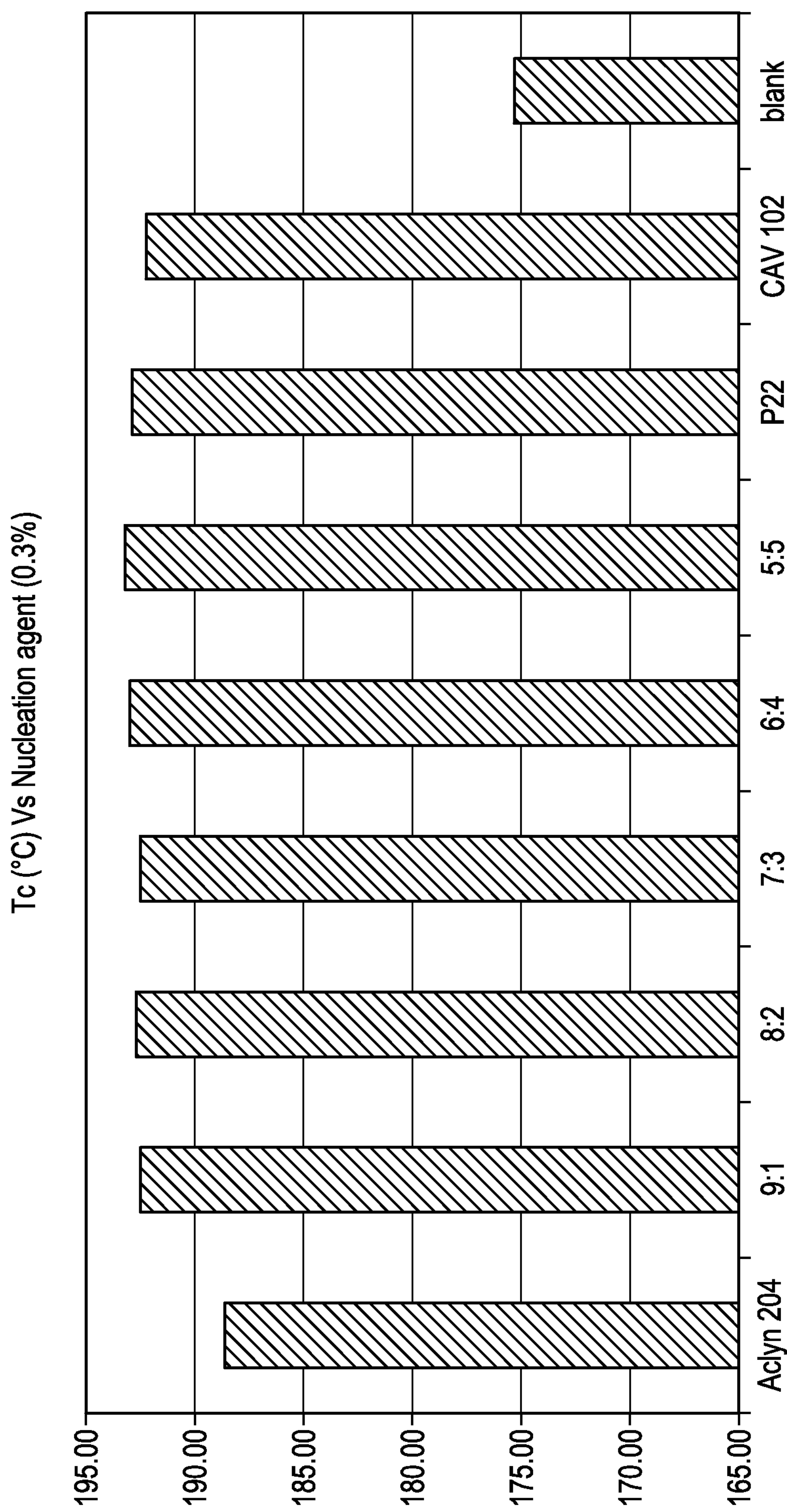
Figure 3B:
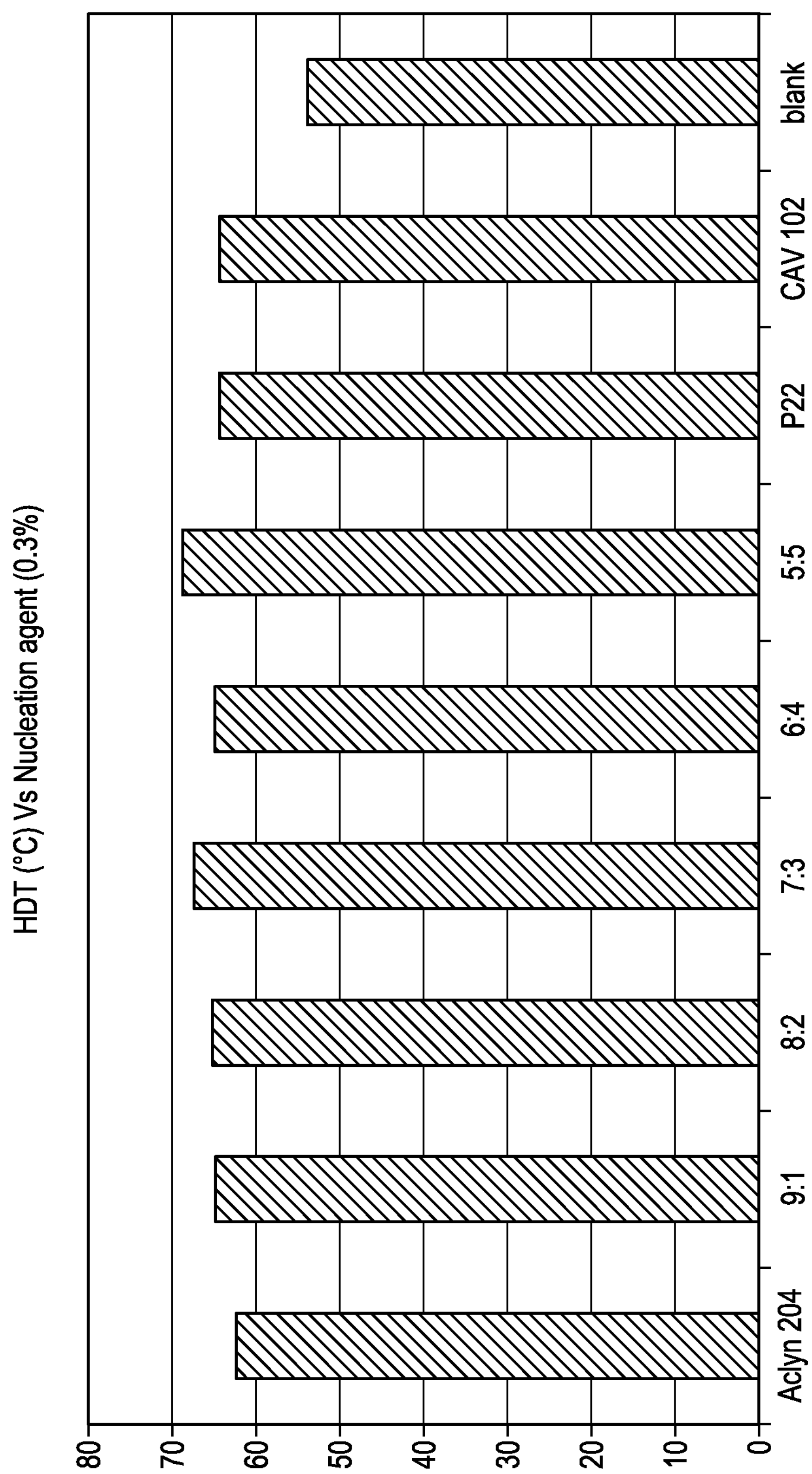
Figure 3C:
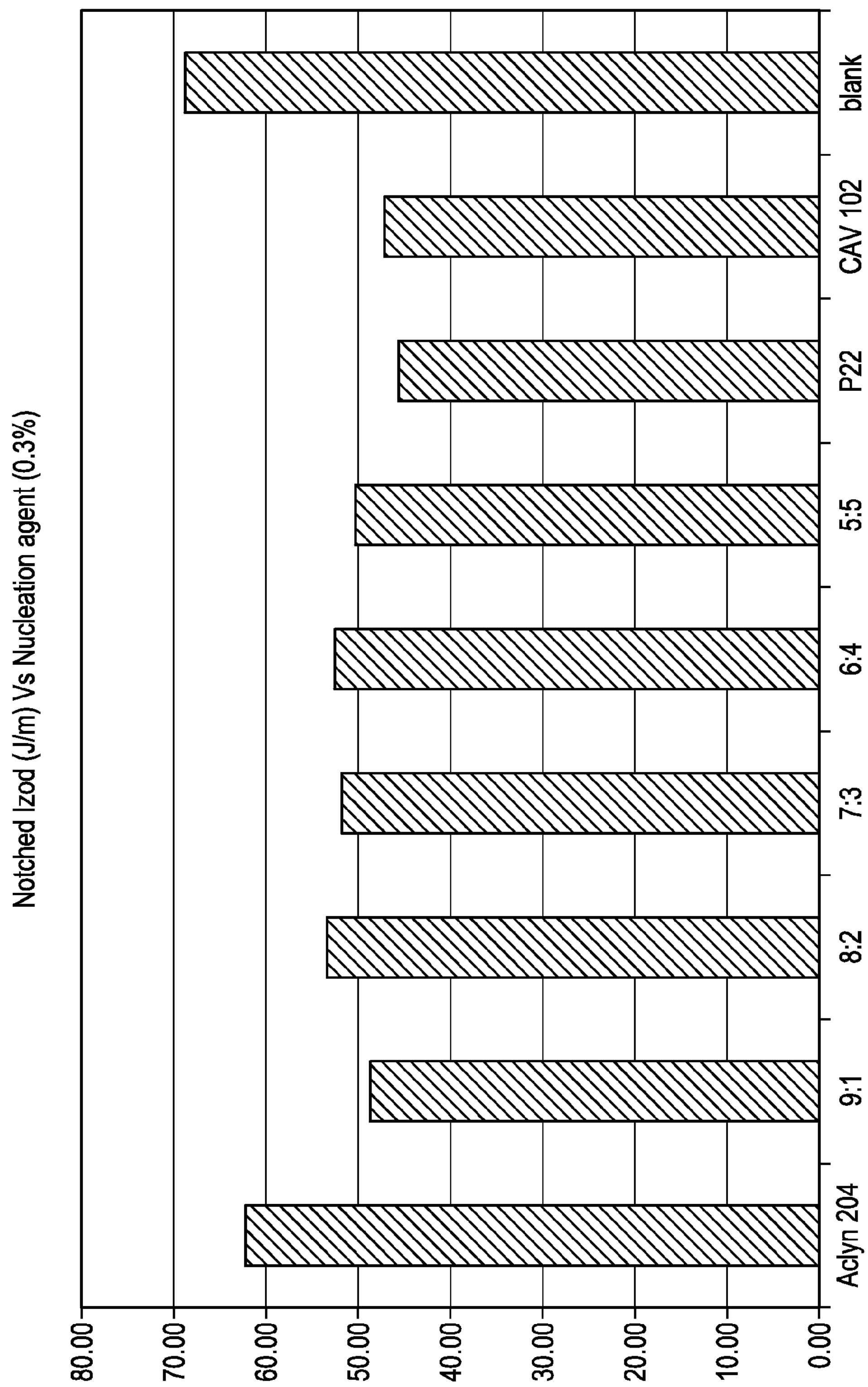

FIG. 3 shows the effects of different blends of the ethylene-acrylic acid calcium ionomer sold under the trademark ACLYN® 204 and talcum on the nucleation temperature (top panel), heat distortion temperature (HDT) (center panel) and notched izod strength (bottom panel) of nylon 6 resin. The controls were the same as those described above. The ratios underneath the histograms indicate the relative amounts of the ACLYN® 204 product and the talcum (only ACLYN® 204 was used to generate the very first data point on the left). The total amount of the ACLYN® 204 product and talcum combined remained constant at 0.3 weight % of the nylon 6 resin weight.

Figure 4A:
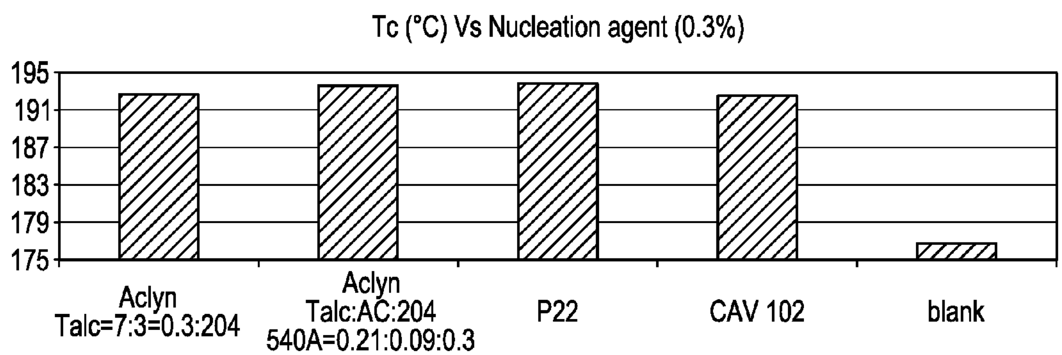
Figure 4B:
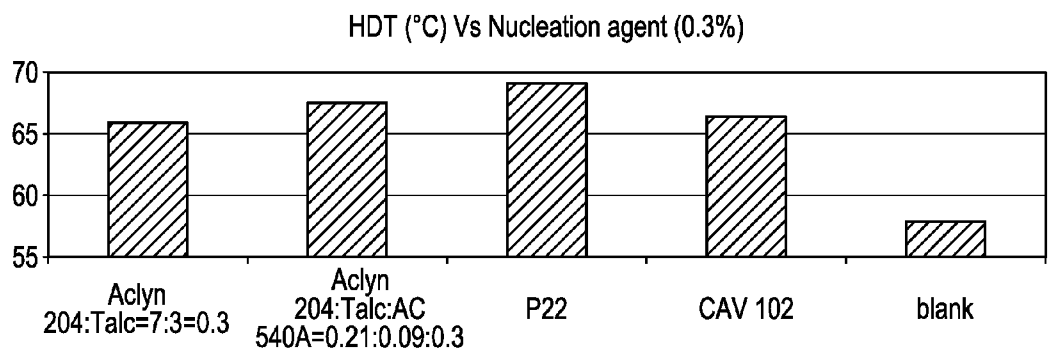
Figure 4C:
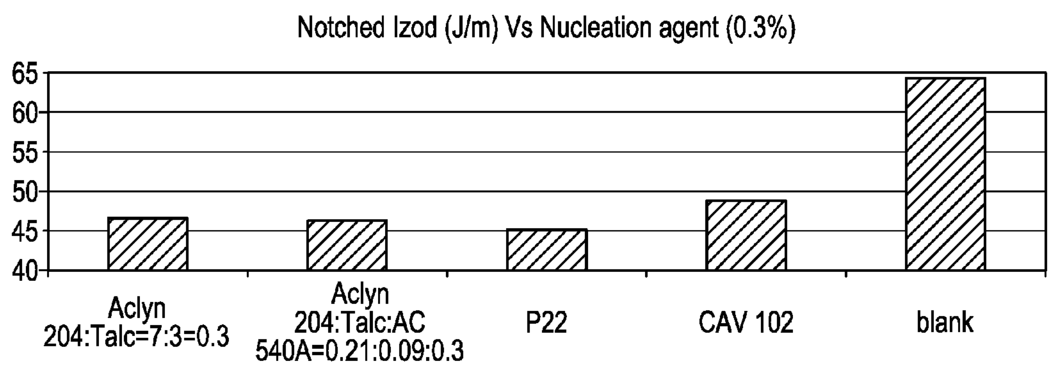

FIG. 4 shows the effects of different blends of the ethylene-acrylic acid calcium ionomer sold under the trademark ACLYN® 204, talcum and the ethylene-acrylic acid copolymer sold under the trademark A-C® 540A on the nucleation temperature (top panel), heat distortion temperature (HDT) (center panel) and notched izod strength (bottom panel) of nylon 6 resin. The controls were the same as those described above. The ratios underneath the histograms indicate the relative amounts of the ACLYN® 204 product, the talcum and the A-C® 540A product. The total amount of the ACLYN® 204 product, the talcum and the A-C® 540A product combined remained constant at 0.3 weight % of the nylon 6 resin weight.

Figure 5A:
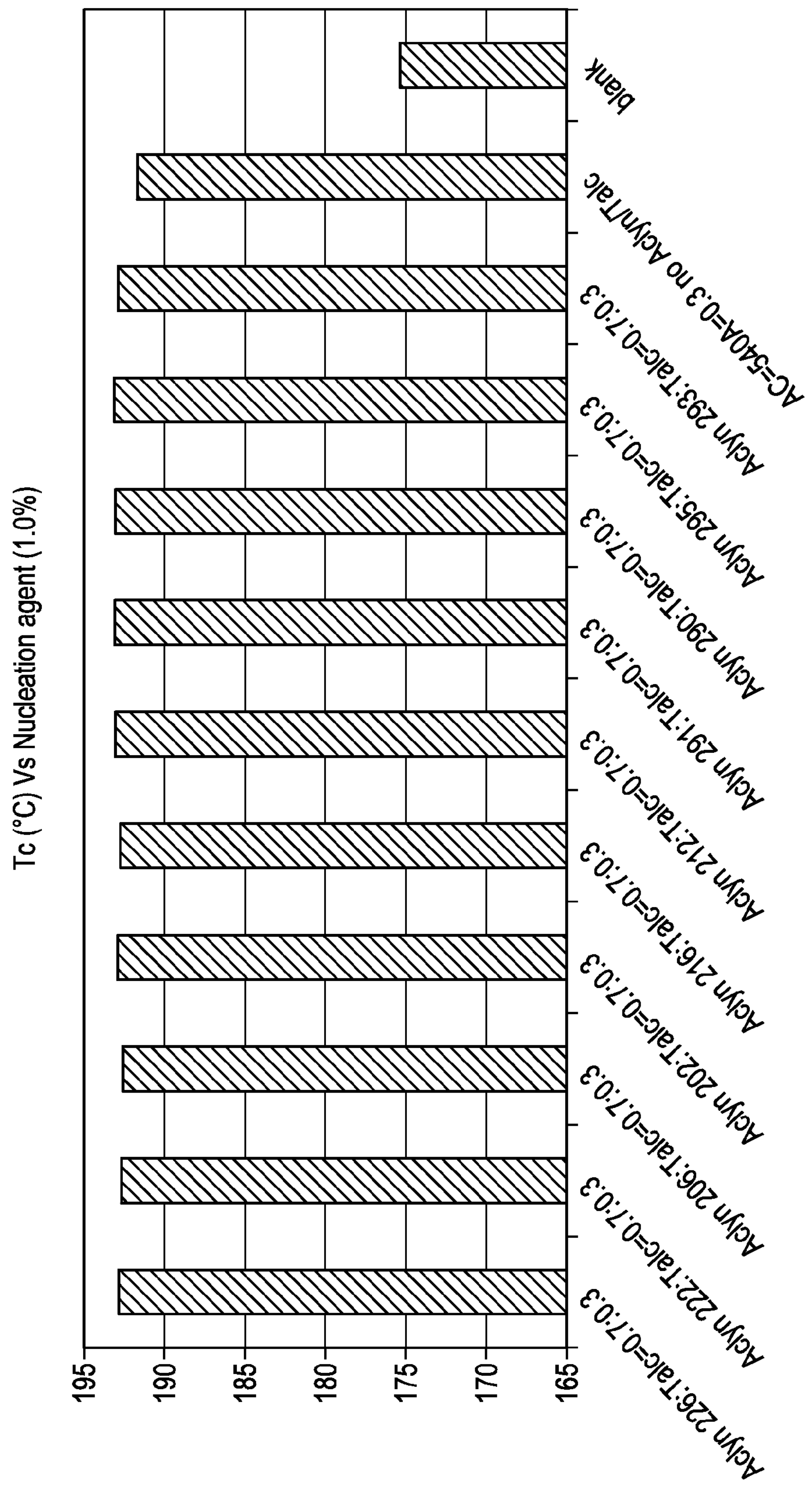
Figure 5B:
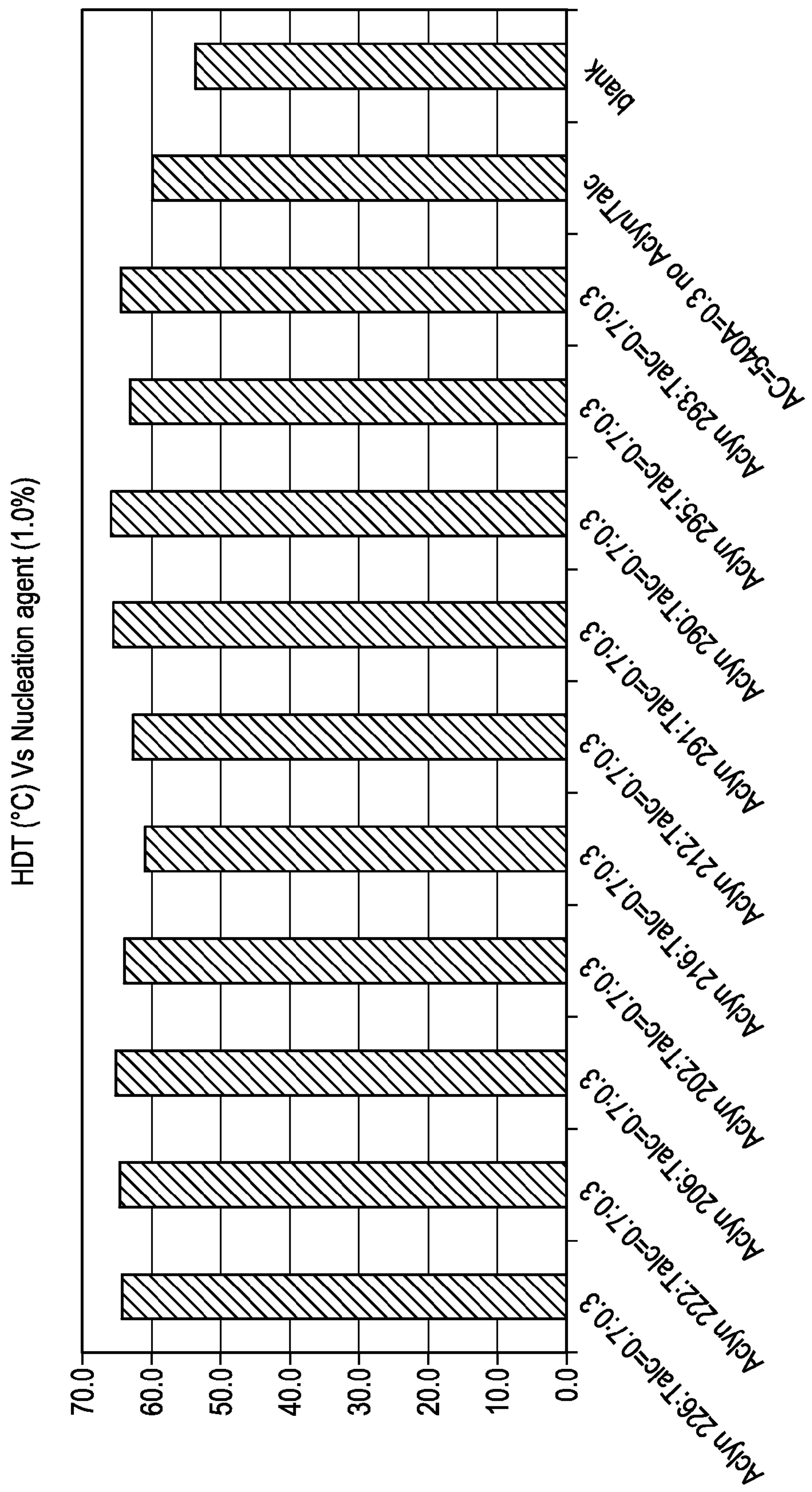
Figure 5C:
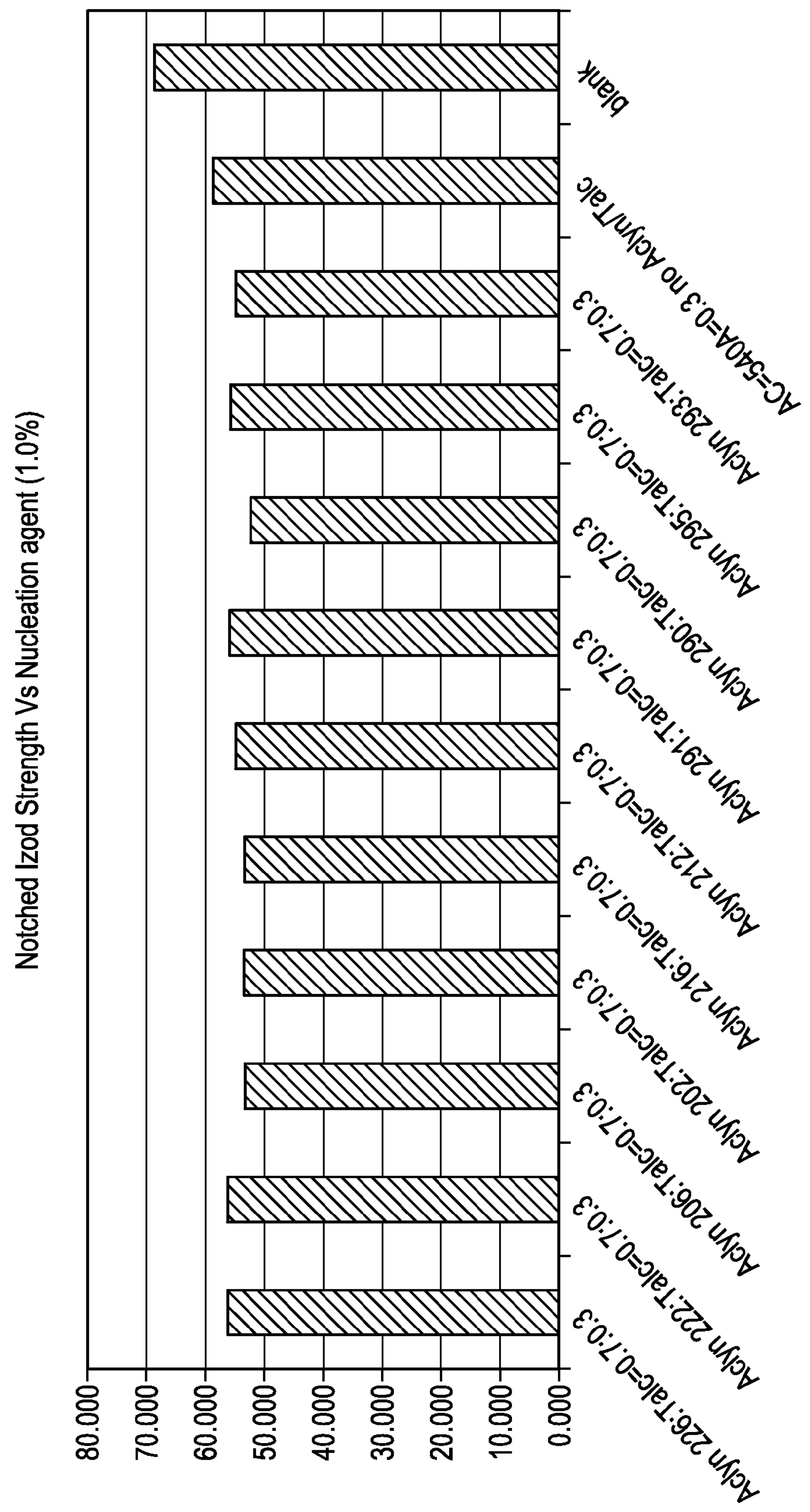

FIG. 5 shows the effects of blends of different ethylene-acrylic acid zinc or calcium ionomers sold under the trademark ACLYN® and talcum on the parameters described above. The ratios underneath the histograms indicate the relative amounts of the ACLYN® 204 product, the talcum and the A-C® 540A product. One test sample contained only the A-C® 540A product and the blank sample did not contain any of the ACLYN® 204 product, the talcum or the A-C® 540A product. The total amount of the nucleating agent combined remained constant at 1.0 weight % of the nylon 6 resin weight.

Figure 6A:
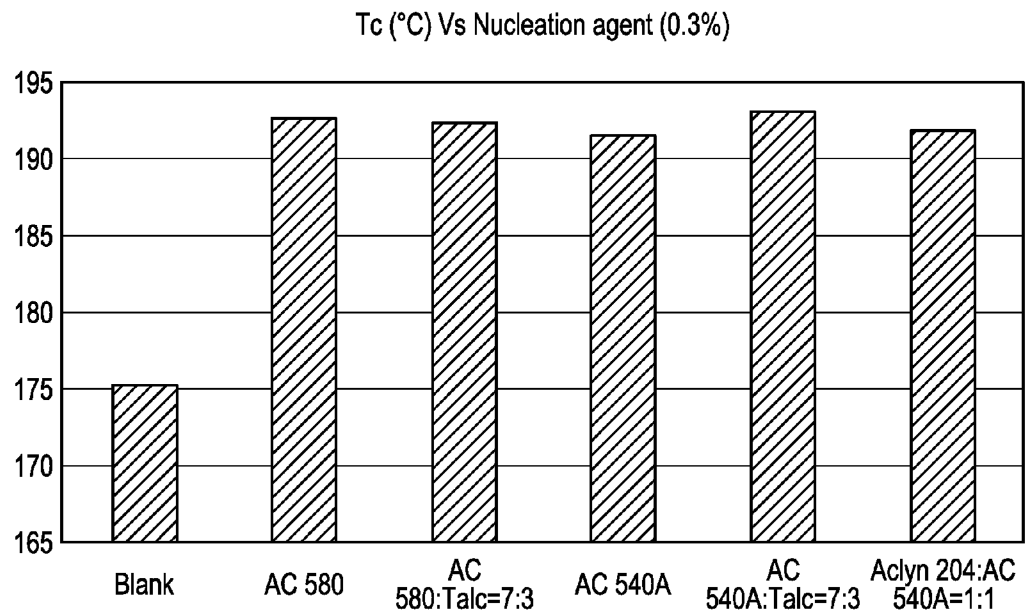
Figure 6B:
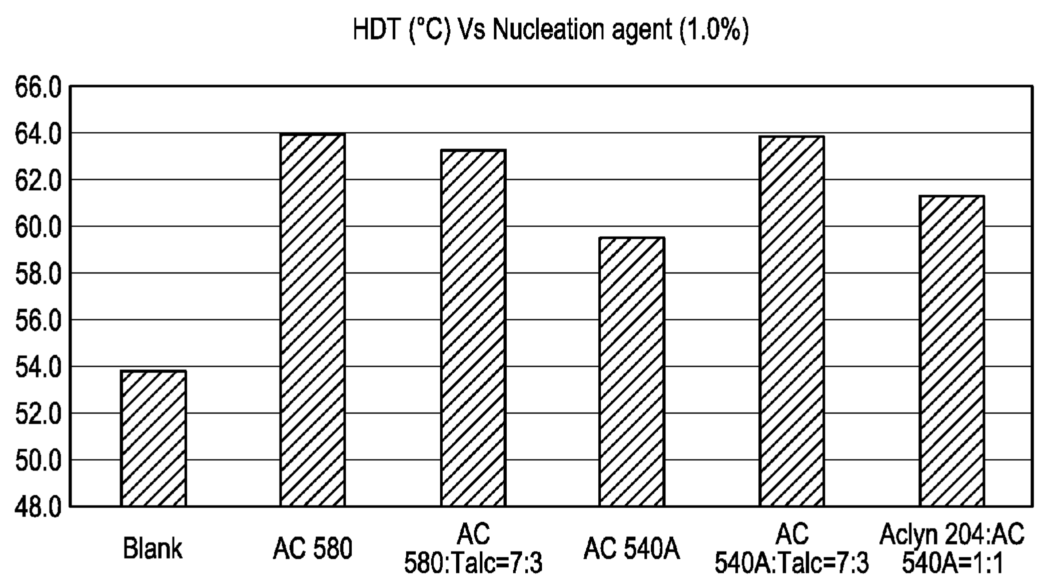
Figure 6C:
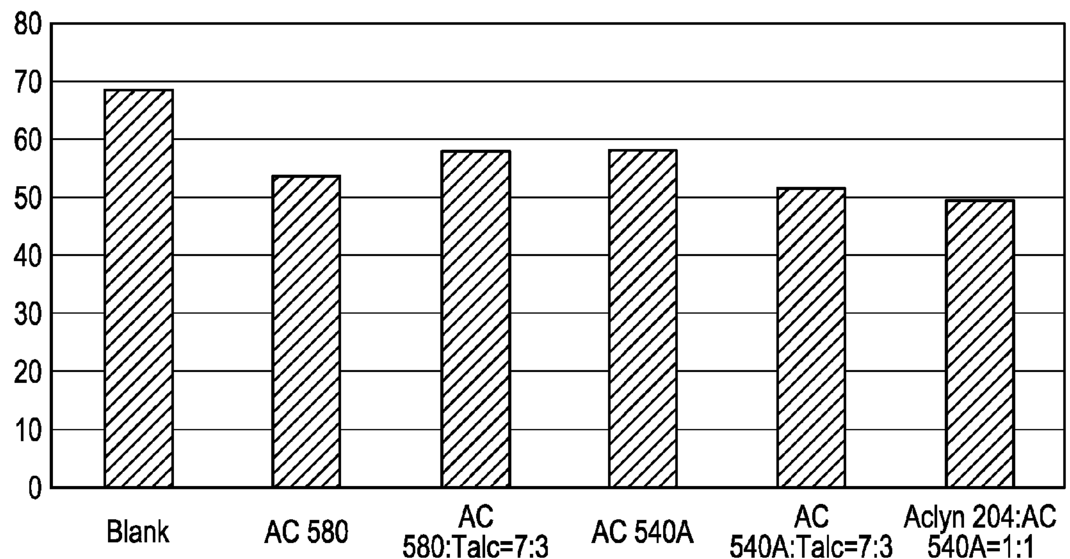

FIG. 6 shows the effects of ethylene-acrylic acid copolymers sold under the trademarks A-C® 540A and A-C® 580, as well as blends of these copolymers and talcum or the ethylene-acrylic acid calcium ionomer sold under the trademark ACLYN® 204, as indicated, on the parameters described above. The ratios underneath the histograms indicate the relative amounts of the ethylene-acrylic acid copolymers, the talcum and the ACLYN® 204 product. The total amount of the ethylene-acrylic acid copolymers, the talcum and the ACLYN® 204 product combined was 0.3 or 1.0 weight % of the nylon 6 resin weight, as indicated. Nylon 6 resin containing no nucleating agent (blank) served as a negative control.

DETAILED DESCRIPTION OF THE INVENTION

According to U.S. Pat. No. 4,536,533, the art of increasing the crystallization rate for certain polymers through the use of specific nucleating agents or crystallization promoters is known. However, this art of crystallization promotion is an empirical one and the findings with one polymer system cannot, as a rule, be applied to a different polymer.

It has now been found that a nucleating agent can be made that allows the manufacture of nylon resins with improved crystallization rate, nucleation and heat distortion temperature, mold release and impact strength. The present invention further provides a plastic composition including nylon and a nucleating agent, as well as a process of making this plastic composition. The nucleating agent includes ethylene-acrylic acid ionomers selected from the group consisting of ethylene-acrylic acid calcium ionomers and ethylene-acrylic acid zinc ionomers and combinations thereof, wherein the ionomers have a molecular weight between about 1000 and about 10000, as well as talcum and ethylene-acrylic acid copolymers.

Nylon is the generic name for a family of polyamide polymers characterized by the presence of the amide group —CONH in the backbone. The type of polyamides employed in the practice of this invention can vary widely. Non-limiting examples of polyamides useful in the conduct of this invention are those which are produced by polymerizing monoamino monocarboxylic acids, or lactams thereof, or a mixture of a diamine and a dicarboxylic acid optionally together with a monoaminomonocarboxylic acid. Non-limiting examples of such lactams and monocarboxylic acids are e-amino caproic acid, caprolactam, 4-aminobutyric acid, 6-aminohexanoic acid, 7-aminoheptanoic acid, 8-aminooctanoic acid, 10-aminodecanoic acid, 12-aminododecanoic acid, 9-aminonanoic acid, 11-aminoundecanoic acid, 17-aminoheptadecanoic acid, capryllactam, enanthiolactam and the like. In an embodiment of the present invention, amines are of the general formula $H_2N(CH_2)_mNH_2$ wherein m is an integer of from about 2 to about 12, such as trimethylene diamine, octamethylene diamine, nonamethylene diamine, decamethylene diamine, metaphenylene diamine, tetramethylene diamine, pentamethylene diamine, hexamethylene diamine and the like. In an embodiment of the present invention, dicarboxylic acids are of the formula HOOC—Y—COOH, wherein Y is a divalent aliphatic radical containing at least 1 carbon atom, as for example, sebacic acid, octadecanoic acid, suberic acid, azelaic acid, undecanoic acid, glutaric acid, pimelic acid, adipic acid and the like or is an aromatic moiety as for example terephthalic acid, isophthalic acid and the like. See U.S. Pat. No. 4,749,736. In some embodiments of the present invention, the polyamides include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly (heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. See U.S. Pat. No. 6,726, 968. All the above nylons are included in the scope of the present invention, as well as mixtures of these nylons.

Ionomers are polymers or copolymers that are characterized by the presence of both electrically neutral units and ionized units, which gives ionomers unique physical properties. Ionomers are routinely used in the art. See, for example, Susan E. M. Selke, *Plastic Packaging*, Carl Hanser Verlag, $2^{nd}$ Edition, 2004, pages 96-97. The ionomers of the present invention include the metal salts of ethylene-acrylic acid copolymers. The preparation of the base ethylene-acrylic acid copolymers may be performed in accordance with any of a plurality of methods known to those skilled in the art, including the copolymerization of a mixture of ethylene and acrylic acid monomers. The ethylene-acrylic acid copolymers used for the preparation of the ionomers of the present invention can be made from various ratios of ethylene:acrylic acid monomers, depending on the particular properties that the resulting ionomer is meant to have. The acid groups of the base ethylene-acrylic acid copolymer may be subsequently neutralized to form the ionomer thereof, by contacting the base copolymer with a basic compound which contains a particular metal ion.

Useful metal ions may include those which have a valence of 1 to 3 inclusive, and particularly include those of Groups IA, IB, HA, IIB, IIIA, IVA, VA, VIB, VIIB, and VIIIB of the Periodic Table of Elements. Non-limiting examples of such metal ions are lithium, sodium, potassium, calcium, beryllium, magnesium, zinc, cadmium, strontium, aluminum, lead, chromium, molybdenum, manganese, iron, cobalt, germanium, nickel, copper, silver, mercury, tin, platinum, boron, antimony, copper manganese, zinc, lithium, calcium and lead. Different relative amounts of the basic compound which contains a particular metal ion may be used in order to obtain various degrees of neutralization.

The contacting of the base copolymer with a basic compound which contains a particular metal ion may be performed in a number of ways known in the art, including, but not limited to, by blending or mixing.

In an embodiment of the present invention, the degree of neutralization of the ionic copolymer by the metal cations is at least about 10% of the carboxylic acid groups of the base copolymer. In another embodiment of the present invention, the range of neutralization is between about 30% and about 100% of the acid groups present in the base copolymer. In another embodiment of the present invention, the range of neutralization is in excess of about 50% of the acid groups present in the base copolymer. The degree of neutralization may be measured by several techniques known in the art, including infrared analysis or titration. These techniques as well as other suitable techniques are disclosed in "Ionic Copolymers" by L. Holliday, published by John Wiley & Sons, New York (1975) at pp. 74-75.

In an embodiment of the invention, the ethylene-acrylic acid ionomers consist essentially of the ethylene-acrylic acid calcium ionomers sold under the trademark ACLYN® 204. The ACLYN® 204 product has a neutralization degree of 75%. The ACLYN® 204 product can be obtained from Honeywell International Inc., Morristown, N.J., USA. Other ethylene-acrylic acid calcium and zinc ionomers sold under the trademark ACLYN® (see Examples below) can be obtained from the same source. ACLYN® 204 has a molecular weight of between about 2000 to 6000. The product soled by Honeywell under the trademark ACLYN® 226 is an ethylene-acrylic acid calcium ionomer with a neutralization degree of 98%. The product sold by Honeywell under the trademark ACLYN® 224 is an ethylene-acrylic acid calcium ionomer with a neutralization degree of 75%. The product sold by Honeywell under the trademark ACLYN® 222 is an ethylene-acrylic acid calcium ionomer with a neutralization degree of 50%. The product sold by Honeywell under the trademark ACLYN® 206 is an ethylene-acrylic acid calcium ionomer with a neutralization degree of 98%. The product sold by Honeywell under the trademark ACLYN® 202 is an ethylene-acrylic acid calcium ionomer with a neutralization degree of 50%. The product sold by Honeywell under the trademark ACLYN® 216 is an ethylene-acrylic acid calcium ionomer with a neutralization degree of 98%. The product sold by Honeywell under the trademark ACLYN® 212 is an ethylene-acrylic acid calcium ionomer with a neutralization degree of 50%. The product sold by Honeywell under the trademark ACLYN® 290 is an ethylene-acrylic acid zinc ionomer with a neutralization degree of 25%. The product sold by Honeywell under the trademark ACLYN® 291 is an ethylene-acrylic acid zinc ionomer with a neutralization degree of 50%. The product sold by Honeywell under the trademark ACLYN® 293 is an ethylene-acrylic acid zinc ionomer with a neutralization degree of 25%. The product sold by Honeywell under the trademark ACLYN® 295 is an ethylene-acrylic acid zinc ionomer with a neutralization degree of 98%.

In an embodiment of the present invention, the ethylene-acrylic acid ionomers have a molecular weight between about 1000 and about 10000. In another embodiment, the ethylene-acrylic acid ionomers have a molecular weight between about 1000 and about 2500. In another embodiment, the ethylene-acrylic acid ionomers have a molecular weight between about 2500 and about 3000. In another embodiment, the ethylene-acrylic acid ionomers have a molecular weight between about 3000 and about 4000. In another embodiment, the ethylene-acrylic acid ionomers have a molecular weight between about 4000 and about 5000. In another embodiment, the ethylene-acrylic acid ionomers have a molecular weight between about 5000 and about 6000. In another embodiment, the ethylene-acrylic acid ionomers have a molecular weight between about 6000 and about 7000. In another embodiment, the ethylene-acrylic acid ionomers have a molecular weight between about 7000 and about 8000. In another embodiment, the ethylene-acrylic acid ionomers have a molecular weight between about 8000 and about 9000. In another embodiment, the ethylene-acrylic acid ionomers have a molecular weight between about 9000 and about 10000. In another embodiment, the ethylene-acrylic acid ionomers have a molecular weight between about 4000 and about 8000. In another embodiment, the ethylene-acrylic acid ionomers have a molecular weight between about 5000 and about 7000. In some embodiments of the present invention, the weight average molecular weight of all ethylene-acrylic acid ionomers in the nucleating agent is between about 1500 and about 3000, between about 3000 and about 4500, between about 4500 and about 6000, between about 6000 and about 7500, and between about 7500 and about 9000.

Talc is a mineral composed of hydrated magnesium silicate. It has the chemical formula $H_2Mg_3(SiO_3)_4$ or $Mg_3Si_4O_{10}(OH)_2$. Loose talc is known as talcum or talcum powder. In addition, talc and talc derivatives are also known under the following names: Agalite, Alpine talc USP, bc 127, Asbestine, B 13, B 13 (mineral), B 9, Beaver White 200, CCRIS 3656, CI 77718, CP 10-40, CP 38-33, Crystalite CRS 6002, Desertalc 57, EINECS 238-877-9, EX-IT, Emtal 500, Emtal 549, Emtal 596, Emtal 599, FW-XO, Fibrene C 400, Finntalc C10, Finntalc M05, Finntalc M15, Finntalc P40, Finntalc PF, French chalk, HSDB 830, Hydrous magnesium silicate, IT Extra, LMR 100, Lo Micron talc USP, bc 2755, MP 12-50, MP 25-38, MP 40-27, MP 45-26, MST, Magnesium silicate talc, Magnesium silicate, hydrous, Micro Ace K1, Micro Ace L1, Micron White 5000A, Micron White 5000P, Micron White 5000S, Microtalco IT Extra, Mistron 139, Mistron 2SC, Mistron RCS, Mistron Star, Mistron frost P, Mistron super frost, Mistron vapor, Mussolinite, NCI-006008, Nonasbestiform talc, Nonfibrous talc, Nytal 200, Nytal 400, P 3, P 3 (Mineral), PK-C, PK-N, Polytal 4641, Polytal 4725, Sclerosol, Snowgoose, Soapstone, Steatite, Steatite talc, Steawhite, Supreme, Supreme dense, TY 80, Talc, Talc (Mg3H2(SiO3)4), Talc, non-asbestos form, Talcan PK-P, Talcron CP 44-31, UNII-7SEV7J4R1U. Talc and its derivatives are widely used in a number of industries and commercially available from many sources commonly known in the art.

Ethylene-acrylic acid copolymers are conventionally used in the manufacture of plastics and well known in the art. See, for example, Susan E. M. Selke, *Plastic Packaging*, Carl Hanser Verlag, 2nd Edition, 2004, pages 95-96. Accordingly, ethylene-acrylic acid copolymers are not further described herein in detail. The ethylene-acrylic acid copolymers used in the present invention can be made from various ratios of ethylene:acrylic acid monomers, depending on the particular properties that the resulting copolymer is meant to have.

In an embodiment of the invention, the ethylene-acrylic acid copolymers consist essentially of ethylene-acrylic acid copolymers sold under the trademark A-C® 540A. The A-C® 540A product can be obtained from Honeywell International Inc., Morristown, N.J., USA.

In an embodiment of the present invention, the ethylene-acrylic acid copolymers have a molecular weight between about 1000 and about 10000. In another embodiment, the ethylene-acrylic acid copolymers have a molecular weight between about 1000 and about 2500. In another embodiment, the ethylene-acrylic acid copolymers have a molecular weight between about 2500 and about 3000. In another embodiment, the ethylene-acrylic acid copolymers have a molecular weight between about 3000 and about 4000. In another embodiment, the ethylene-acrylic acid copolymers have a molecular weight between about 4000 and about 5000. In another embodiment, the ethylene-acrylic acid copolymers have a molecular weight between about 5000 and about 6000. In another embodiment, the ethylene-acrylic acid copolymers have a molecular weight between about 6000 and about 7000. In another embodiment, the ethylene-acrylic acid copolymers have a molecular weight between about 7000 and about 8000. In another embodiment, the ethylene-acrylic acid copolymers have a molecular weight between about 8000 and about 9000. In another embodiment, the ethylene-acrylic acid copolymers have a molecular weight between about 9000 and about 10000. In another embodiment, the ethylene-acrylic acid copolymers have a molecular weight between about 2500 and about 3500. In some embodiments of the present invention, the weight average molecular weight of all ethylene-acrylic acid copolymers in the nucleating agent is between about 1500 and about 3000, between about 3000 and about 4500, between about 4500 and about 6000, between about 6000 and about 7500, and between about 7500 and about 9000.

In an embodiment of the present invention, the ethylene-acrylic acid calcium ionomers are present at a concentration of between about 35 weight % and about 45 weight % of the total weight of the nucleating agent. In another embodiment, the ethylene-acrylic acid calcium ionomers are present at a concentration of between about 35 weight % and about 37 weight % of the total weight of the nucleating agent. In another embodiment, the ethylene-acrylic acid calcium ionomers are present at a concentration of between about 37 weight % and about 39 weight % of the total weight of the nucleating agent. In another embodiment, the ethylene-acrylic acid calcium ionomers are present at a concentration of between about 39 weight % and about 41 weight % of the total weight of the nucleating agent. In another embodiment, the ethylene-acrylic acid calcium ionomers are present at a concentration of between about 41 weight % and about 43 weight % of the total weight of the nucleating agent. In another embodiment, the ethylene-acrylic acid calcium ionomers are present at a concentration of between about 43 weight % and about 45 weight % of the total weight of the nucleating agent.

In an embodiment of the present invention, the talcum is present at a concentration of between about 15 weight % and about 25 weight % of the total weight of the nucleating agent. In another embodiment, the talcum is present at a concentration of between about 15 weight % and about 17 weight % of the total weight of the nucleating agent. In another embodiment, the talcum is present at a concentration of between about 17 weight % and about 19 weight % of the total weight of the nucleating agent. In another embodiment, the talcum is present at a concentration of between about 19 weight % and about 21 weight % of the total weight of the nucleating agent. In another embodiment, the talcum is present at a concentration of between about 21 weight % and about 23 weight % of the total weight of the nucleating agent. In another embodiment, the talcum is present at a concentration of between about 23 weight % and about 25 weight % of the total weight of the nucleating agent.

In an embodiment of the present invention, the ethylene-acrylic acid copolymers are present at a concentration of between about 35 weight % and about 45 weight % of the total weight of the nucleating agent. In another embodiment, the ethylene-acrylic acid copolymers are present at a concentration of between about 35 weight % and about 37 weight % of the total weight of the nucleating agent. In another embodiment, the ethylene-acrylic acid copolymers are present at a concentration of between about 37 weight % and about 39 weight % of the total weight of the nucleating agent. In another embodiment, the ethylene-acrylic acid copolymers are present at a concentration of between about 39 weight % and about 41 weight % of the total weight of the nucleating agent. In another embodiment, the ethylene-acrylic acid copolymers are present at a concentration of between about 41 weight % and about 43 weight % of the total weight of the nucleating agent. In another embodiment, the ethylene-acrylic acid copolymers are present at a concentration of between about 43 weight % and about 45 weight % of the total weight of the nucleating agent.

In an embodiment of the present invention, the ethylene-acrylic acid calcium ionomers are present at a concentration of between about 0.17 weight % and about 0.25 weight % of the total nylon weight. In another embodiment, the ethylene-acrylic acid calcium ionomers are present at a concentration of between about 0.17 weight % and about 0.19 weight % of the total nylon weight. In another embodiment, the ethylene-acrylic acid calcium ionomers are present at a concentration of between about 0.19 weight % and about 0.21 weight % of the total nylon weight. In another embodiment, the ethylene-acrylic acid calcium ionomers are present at a concentration of between about 0.21 weight % and about 0.23 weight % of the total nylon weight. In another embodiment, the ethylene-acrylic acid calcium ionomers are present at a concentration of between about 0.23 weight % and about 0.25 weight % of the total nylon weight.

In an embodiment of the present invention, the talcum is present at a concentration of between about 0.06 weight % and about 0.12 weight % of the total nylon weight. In another embodiment, the talcum is present at a concentration of between about 0.06 weight % and about 0.08 weight % of the total nylon weight. In another embodiment, the talcum is present at a concentration of between about 0.08 weight % and about 0.1 weight % of the total nylon weight. In another embodiment, the talcum is present at a concentration of between about 0.1 weight % and about 0.12 weight % of the total nylon weight.

In an embodiment of the present invention, the ethylene-acrylic acid copolymers are present at a concentration of between about 0.16 weight % and about 0.25 weight % of the total nylon weight. In another embodiment, the ethylene-acrylic acid copolymers are present at a concentration of between about 0.16 weight % and about 0.18 weight % of the total nylon weight. In another embodiment, the ethylene-acrylic acid copolymers are present at a concentration of between about 0.18 weight % and about 0.2 weight % of the total nylon weight. In another embodiment, the ethylene-acrylic acid copolymers are present at a concentration of between about 0.2 weight % and about 0.22 weight % of the total nylon weight. In another embodiment, the ethylene-acrylic acid copolymers are present at a concentration of between about 0.22 weight % and about 0.25 weight % of the total nylon weight.

In a preferred embodiment of the present invention, the ethylene-acrylic acid calcium ionomers are present at a concentration of about 0.21 weight % of the total nylon weight; the talcum is present at a concentration of about 0.09 weight % of the total nylon weight; and the ethylene-acrylic acid copolymers are present at a concentration of about 0.20 weight % of the total nylon weight.

In an embodiment of the present invention, the nucleating agent is present at a concentration of between about 0.35 weight % and about 0.65 weight % of the total nylon weight. In another embodiment, the nucleating agent is present at a concentration of between about 0.35 weight % and about 0.45 weight % of the total nylon weight. In another embodiment, the nucleating agent is present at a concentration of between about 0.45 weight % and about 0.55 weight % of the total nylon weight. In another embodiment, the nucleating agent is present at a concentration of between about 0.55 weight % and about 0.65 weight % of the total nylon weight.

In an embodiment of the present invention, the plastic composition has a crystallization rate of between about 800 and about 900 1000*/t1/2 per minute. In another embodiment, the plastic composition has a crystallization rate of between about 800 and about 825 1000*/t1/2 per minute. In another embodiment, the plastic composition has a crystallization rate of between about 825 and about 850 1000*/t1/2 per minute. In another embodiment, the plastic composition has a crystallization rate of between about 850 and about 875 1000*/t1/2 per minute. In another embodiment, the plastic composition has a crystallization rate of between about 875 and about 900 1000*/t1/2 per minute.

In an embodiment of the present invention, the plastic composition has a nucleation temperature of between about 180° C. and about 200° C. In another embodiment, the plastic composition has a nucleation temperature of between about 180° C. and about 185° C. In another embodiment, the plastic composition has a nucleation temperature of between about 185° C. and about 190° C. In another embodiment, the plastic composition has a nucleation temperature of between about 190° C. and about 195° C. In another embodiment, the plastic composition has a nucleation temperature of between about 195° C. and about 200° C.

In an embodiment of the present invention, the plastic composition has a heat distortion temperature of between about 60° C. and about 70° C. In another embodiment, the plastic composition has a heat distortion temperature of between about 60° C. and about 62.5° C. In another embodiment, the plastic composition has a heat distortion temperature of between about 62.5° C. and about 65° C. In another embodiment, the plastic composition has a heat distortion temperature of between about 65° C. and about 67.5° C. In another embodiment, the plastic composition has a heat distortion temperature of between about 67.5° C. and about 70° C.

In an embodiment of the present invention, the plastic composition has a notched izod strength of between about 40 J/m and about 50 J/m. In another embodiment, the plastic composition has a notched izod strength of between about 40 J/m and about 42.5 J/m. In another embodiment, the plastic composition has a notched izod strength of between about 42.5 J/m and about 45 J/m. In another embodiment, the plastic composition has a notched izod strength of between about 45 J/m and about 47.5 J/m. In another embodiment, the plastic composition has a notched izod strength of between about 47.5 J/m and about 50 J/m.

In addition to the above-described components, the plastic composition of this invention can include various optional components which are additives commonly employed with polyamide resins. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art and, accordingly, not further described herein in detail.

The nucleating agent of this invention can be prepared by mixing the main ingredients, and other optional components, as uniformly as possible employing any conventional means. A non-limiting example of how the nucleating agent of the present invention may be prepared is described in Example 1 below.

The plastic composition of this invention can be prepared by mixing the main ingredients, and other optional components, as uniformly as possible employing any conventional blending means. Appropriate blending means, such as melt extrusion, batch melting and the like, are well known in the art and will not be described herein in greater detail. A non-limiting example of how the plastic composition of the present invention may be prepared is described in Example 2 below.

Molecular weights of polymers described herein are measured using gel permeation chromatography. Molecular weights are determined by comparing the retention time of the polymers analyzed with the retention time of established molecular weight standards, e.g., polyethylene, which is commercially available form Agilent Technologies, Santa Clara, Calif., USA.

The ethylene:acrylic acid monomer ratio of ethylene-acrylic acid copolymers is determined as follows. The acid number of the ethylene-acrylic acid copolymers is determined using Method ASTM D-1386. The resulting acid number for the polymer then allows the determination of the relative acrylic acid monomer content of the polymer. An acid number of about 40 is equivalent to a relative acrylic acid content of about 5%. The ethylene-acrylic acid copolymer sold under the trademark A-C® 540 has an acid number of about 40, which equates to an acrylic acid content of about 5% and an ethylene:acrylic acid monomer ratio of about 19:1. The ethylene-acrylic acid copolymer sold under the trademark A-C® 580 has an acid number of about 80, which equates to an acrylic acid content of about 10% and an ethylene:acrylic acid monomer ratio of about 9:1.

The following examples further illustrate the invention, but should not be construed to limit the scope of the invention in any way.

EXAMPLES

Example 1

Making the Nucleating Agent

Pellets of ethylene-acrylic acid calcium ionomers sold under the trademark ACLYN® 204 were cooled with liquid nitrogen and ground into powder with a cryogenic sample crusher. The resulting powder was then mixed with fine talcum powder (Minerals Technologies, Microtalc® MP 12-50) and ethylene-acrylic acid copolymers sold under the trademark A-C® 540A in the desired ratios (see Figures and Example 3 below), using a weightless twin-axes paddle blender to obtain a homogenous final product. For example, a nucleating agent containing 40% ethylene-acrylic acid calcium ionomers, 20% talcum, and 40% ethylene-acrylic acid copolymers with respect to the total weight of the nucleating agent, was made by mixing these three components in a weight ratio of 2:1:2, respectively. Nucleating agents having other ethylene-acrylic acid ionomers sold under the trademark ACLYN® were prepared similarly.

Additionally, the following nucleating agents were produced: (1) a nucleating agent containing only ethylene-acrylic acid copolymers sold under the trademarks A-C® 540A or A-C® 580, but neither talcum nor ethylene-acrylic acid ionomers; (2) a nucleating agent containing only a blend of ethylene-acrylic acid copolymers sold under the trademarks A-C® 540A or A-C® 580 and talcum, but not ethylene-acrylic acid ionomers; and (3) a nucleating agent containing only a blend of ethylene-acrylic acid copolymers sold under the trademark A-C® 540A and ethylene-acrylic acid calcium ionomers sold under the trademark ACLYN® 204, but not talcum. The ethylene-acrylic acid copolymers sold under the trademark A-C® 540A have a molecular weight of between about 2500 and about 3500 and an ethylene:acrylic acid monomer ratio of about 19:1. The ethylene-acrylic acid copolymers sold under the trademark A-C® 580 have an ethylene:acrylic acid monomer ratio of about 9:1. Nucleating agents (1) to (3) were produced in accordance with the description in paragraph [0055], except that talcum and ethylene-acrylic acid ionomers, ethylene-acrylic acid ionomers, and talcum, respectively, were not utilized for the preparation if the nucleating agents.

Example 2

Using the Nucleating Agent 1500 g of nylon 6 homopolymer resin sold under the name H35ZI-GYL by Honeywell were dried at 70° C. for 24 hours in a dehumidification oven and then mixed with 10.8 ml of white oil (paraffin oil) in a Henschel mixing machine for about one minute to ensure the adhesion of the oil to the surface of the resin. Then, 300 g of the above described nucleating agent were added to produce a nucleation master batch and mixing continued for about five minutes. This mixture was then extruded with a twin-screw extruder from Leistritz (D=27 mm; L/D=36) set at a throughput of 15 kg/h and a speed of 250 rpm (main screw: 250 rpm; side screw: 200 rpm). The zone temperatures were as follows: #1=130° C., #2=235° C., #3=240° C., #4=240° C., #5=240° C., #6=240° C., #7=240° C., #8=240° C., and #9=240° C. This nucleation master batch was then dried at 120° C. for two hours.

150 g of the above nucleation master batch was then compounded with 2910 g of H35ZI-GYL nylon 6 homopolymer resin (more in case a lower final concentration of nucleating agent was desired; or less in case a higher final concentration of nucleating agent was desired) and this mix was then extruded with a twin-screw extruder from Leistritz at a throughput of 20 kg/h and a speed of 250 rpm (main screw: 300 rpm; side screw: 220 rpm). The zone temperatures were as follows: #1=145° C., #2=235° C., #3=240° C., #4=240° C., #5=240° C., #6=240° C., #7=240° C., #8=240° C., and #9=240° C. The extruding pellet was then dried at 120° C. for four hours to obtain the modified nylon 6 resin with enhanced properties. The pellets were then melt processed via injection molding into standard test bars and the nylon 6 resins were tested as described below.

For example, a plastic composition wherein the ethylene-acrylic acid calcium ionomers are present at a concentration of about 0.2 weight % of the total nylon weight; wherein the talcum is present at a concentration of about 0.1 weight % of the total nylon weight; and wherein the ethylene-acrylic acid copolymers are present at a concentration of about 0.2 weight % of the total nylon weight was made by mixing ethylene-acrylic acid calcium ionomers, talcum and ethylene-acrylic acid copolymers in a weight ratio of 2:1:2, respectively. This mixture (the nucleating agent) was then mixed (stepwise) with nylon after it had been dried (see above) in a weight ratio of about 1:200 to achieve the desired concentrations of ethylene-acrylic acid calcium ionomers, talcum and ethylene-acrylic acid copolymers in the nylon.

Example 3

Measuring Crystallization Rate, Nucleation Temperature, Heat Distortion Temperature, Notched Izod Strength and Mold Release Different nucleating agents were prepared by using different ethylene-acrylic acid calcium and zinc ionomers blended with different amounts of talcum and ethylene-acrylic acid copolymers, as indicated in FIGS. 1-5 and the corresponding BRIEF DESCRIPTION OF THE DRAWINGS. Blends were then mixed with nylon 6 resin as described in Example 2 above. These different modified nylon 6 resins were then tested for crystallization rate, nucleation and heat distortion temperature, mold release and notched izod strength (also called impact strength). These tests were conducted as follows.

The isothermal crystallization rate was measured by means of standard differential scanning calorimetry (DSC), using a DuPont 9900 automated system. First, samples were heated from 30° C. to 280° C. at a rate of 10° C. per minute. The temperature was then held steady at 280° C. for 5 min and then decreased to 200° C. at a rate of 30° C. per minute. The temperature was then held steady at 200° C. for 10 minutes under a nitrogen atmosphere and the isothermal crystallization rate determined. The peak width at half-height ($T_{1/2}$ min) was evaluated for the isothermal peak; its reciprocal e.g. $1000/_{t1/2}$ is indicative of the overall crystallization rate per minute. See, e.g., U.S. Pat. No. 4,749,736 for details of this procedure.

Nucleation temperature was measured by means of standard differential scanning calorimetry (DSC), using a DuPont 9900 automated system, in a nitrogen atmosphere. A sample of 10.0±0.02 mg was crimped in an aluminum cup, heated to 280° C. at a program rate of 10° C. per minute, held at 280° C. for 5 minutes, and then cooled at a rate of 10° C. per minute to obtain the Tc (crystallization temperature). See, e.g., U.S. Pat. No. 4,749,736 for details of this procedure.

Heat distortion temperature was measured according to the standard ASTM D648 test.

Notched izod strength was measured according to the standard ASTM D256 test.

Mold release was determined by manually inspecting the ease with which a given sample could be removed from its mold.

The tests showed that ethylene-acrylic acid calcium ionomers sold under the trademark ACLYN® 204 and other ethylene-acrylic acid calcium and zinc ionomers, at a dosage of 0.3 weight %, increased the nucleation and heat distortion temperature of nylon 6 resin when compared to the same resin without a nucleating agent (FIG. 1). Additionally, the notched izod strengths of the resins of the present invention was higher than the notched izod strengths of resins containing other commercially available nucleating agents (Cav102, P22) (FIG. 1). Moreover, the resins of the present invention had a crystallization rate that was higher than the crystallization rate of resins without nucleating agent, as the table below shows.

| Aclyn 0.3% | 226 | 224 | 222 | 206 | 204 | 202 | 216 | 212 | 290 | 291 | 293 | 295 | P22 | CAV102 | Blank |
|---|---|---|---|---|---|---|---|---|---|---|---|---|---|---|---|
| $1000^*/t_{1/2}$:$m^{-1}$ | 625 | 621 | 578 | 578 | 599 | 585 | 599 | 613 | 568 | 562 | 578 | 613 | 781 | 781 | 111 |

Similar tests showed that a 0.8 weight % dosage was effective as to the above described parameters, too (FIG. 2 and table below).

| Aclyn 0.8% | 226 | 224 | 222 | 206 | 204 | 202 | 216 | 212 | 290 | 291 | 293 | 295 | P22 | CAV102 | Blank |
|---|---|---|---|---|---|---|---|---|---|---|---|---|---|---|---|
| $1000^*/t_{1/2}$:$m^{-1}$ | 741 | 730 | 709 | 719 | 714 | 709 | 690 | 694 | 694 | 690 | 694 | 690 | 741 | 752 | 111 |

Similar tests showed the effectiveness, as to the above described parameters, of different blends of the ethylene-acrylic acid calcium ionomer sold under the trademark ACLYN® 204 and talcum (FIG. 3 and table below).

| Aclyn with talc | Aclyn 204 | 9:1 | 8:2 | 7:3 | 6:4 | 5:5 | P22 | CAV102 | Blank |
|---|---|---|---|---|---|---|---|---|---|
| $1000^*/t_{1/2}$:$m^{-1}$ | 714 | 775 | 763 | 787 | 794 | 794 | 781 | 781 | 111 |

Similar tests showed the effectiveness, as to the above described parameters, of different blends of the ethylene-acrylic acid calcium ionomer sold under the trademark ACLYN® 204, talcum and the ethylene-acrylic acid copolymers sold under the trademark A-C® 540A (FIG. 4 and table below). Moreover, the blends containing the A-C® 540A product showed increased mold release (data not shown).

| Aclyn with talc and AC 540A | Aclyn 204:Talc = 7:3 | Aclyn 204:Talc:AC 540A = 0.21:0.09:0.3 | P22 | CAV102 | Blank |
|---|---|---|---|---|---|
| 1000*/$t_{1/2}$: $m^{-1}$ | 787 | 862 | 781 | 781 | 111 |

Similar tests showed the effectiveness of ACLYN® products other than ACLYN® 204 in combination with talcum at a 1.0 weight % dosage (FIG. 5 and table below).

| Aclyn:talc:AC540A = 0.21:0.09:0.3 | 226 | 222 | 206 | 202 | 216 | 212 | 290 | 291 | 295 | 293 | No Aclyn and talc | Blank |
|---|---|---|---|---|---|---|---|---|---|---|---|---|
| 1000*/$t_{1/2}$:$m^{-1}$ | 806 | 775 | 735 | 752 | 781 | 758 | 806 | 746 | 758 | 775 | 752 | 111 |

Similar tests showed the effectiveness of ethylene-acrylic acid copolymers sold under the trademarks A-C® 540A and A-C® 580 by Honeywell International, as well as blends of these copolymers and talcum or the ethylene-acrylic acid calcium ionomer sold under the trademark ACLYN® 204 (FIG. 6 and table below).

| 0.3% nucleation agent | blank | AC 580 | AC580:Talc = 7:3 | AC 540 | AC540:Talc = 7:3 | AC540:Aclyn 204 = 1:1 |
|---|---|---|---|---|---|---|
| 1000*/$t_{1/2}$:$m^{-1}$ | 111 | 793.7 | 793.7 | 752 | 787.4 | 775.2 |

What is claimed is:

1. A plastic composition comprising: a) a nylon resin and b) a nucleating agent, the nucleating agent comprising: i) ethylene-acrylic acid ionomers consisting essentially of ethylene-acrylic acid calcium ionomers; wherein the ionomers have a molecular weight between about 1000 and about 10000; ii) talcum; and iii) ethylene-acrylic acid copolymers; wherein the ethylene-acrylic acid calcium ionomers are present at a concentration of between about 0.17 weight % and about 0.25 weight % of the total nylon weight; wherein the talcum is present at a concentration of between about 0.06 weight % and about 0.12 weight % of the total nylon weight; and wherein the ethylene-acrylic acid copolymers are present at a concentration of between about 0.16 weight % and about 0.25 weight % of the total nylon weight.

2. The plastic composition as in claim 1, having a crystallization rate of between about 800 and about 900, having the units of 1000*/t1/2 per minute.

3. The plastic composition as in claim 1, having a nucleation temperature of between about 180° C. and about 200° C.

4. The plastic composition as in claim 1, having a heat distortion temperature of between about 60° C. and about 70° C.

5. The plastic composition as in claim 1, having a notched izod strength of between about 40 J/m and about 50 J/m.

6. A process of making a plastic composition comprising a step of: mixing a nylon resin with a nucleating agent, the nucleating agent comprising: a) ethylene-acrylic acid ionomers selected from the group consisting of ethylene-acrylic acid calcium ionomers and ethylene-acrylic acid zinc ionomers and combinations thereof; wherein the ionomers have a molecular weight between about 1000 and 10000; b) talcum; and c) ethylene-acrylic acid copolymers, wherein the ethylene-acrylic acid calcium ionomers are present at a concentration of between about 0.17 weight % and about 0.25 weight % of the total nylon weight; wherein the talcum is present at a concentration of between about 0.06 weight % and about 0.12 weight % of the total nylon weight; and wherein the ethylene-acrylic acid copolymers are present at a concentration of between about 0.16 weight % and about 0.25 weight % of the total nylon weight.

7. The process of claim 6, wherein the nylon is selected from the group consisting of nylon 6, nylon 6,6 and nylon 6/6,6 and a combination thereof.

8. The process of claim 7, wherein the nylon consists essentially of nylon 6.

9. The process of claim 8, wherein the nucleating agent is present at a concentration of between about 0.35 weight % and about 0.65 weight % of the total nylon weight; and wherein the ethylene-acrylic acid ionomers consist essentially of ethylene-acrylic acid calcium ionomers.

* * * * *